No. 701,046. Patented May 27, 1902.
C. W. HOWLAND.
MACHINE FOR MARKING OR CUTTING LENSES.
(Application filed Oct. 11, 1901.)
(No Model.) 3 Sheets—Sheet 1.
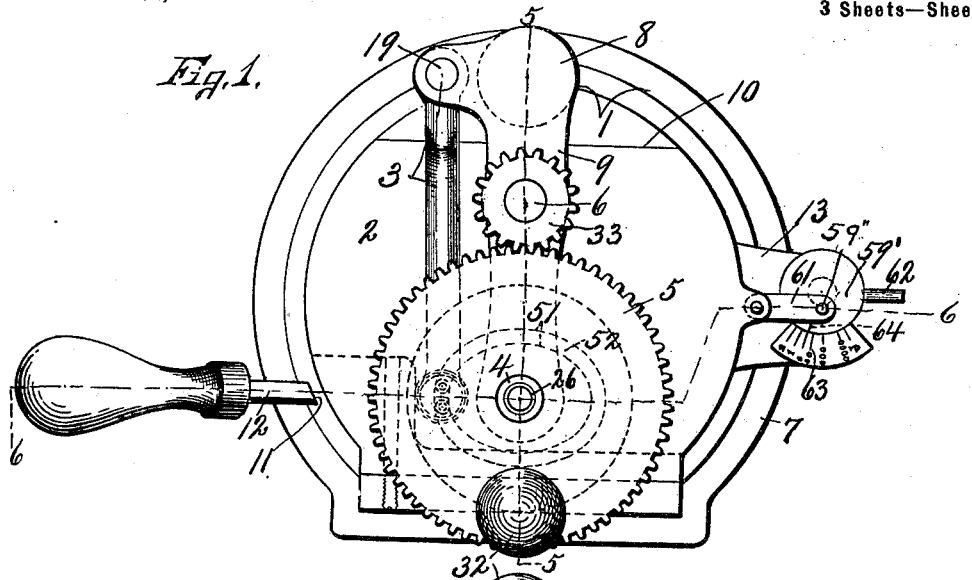
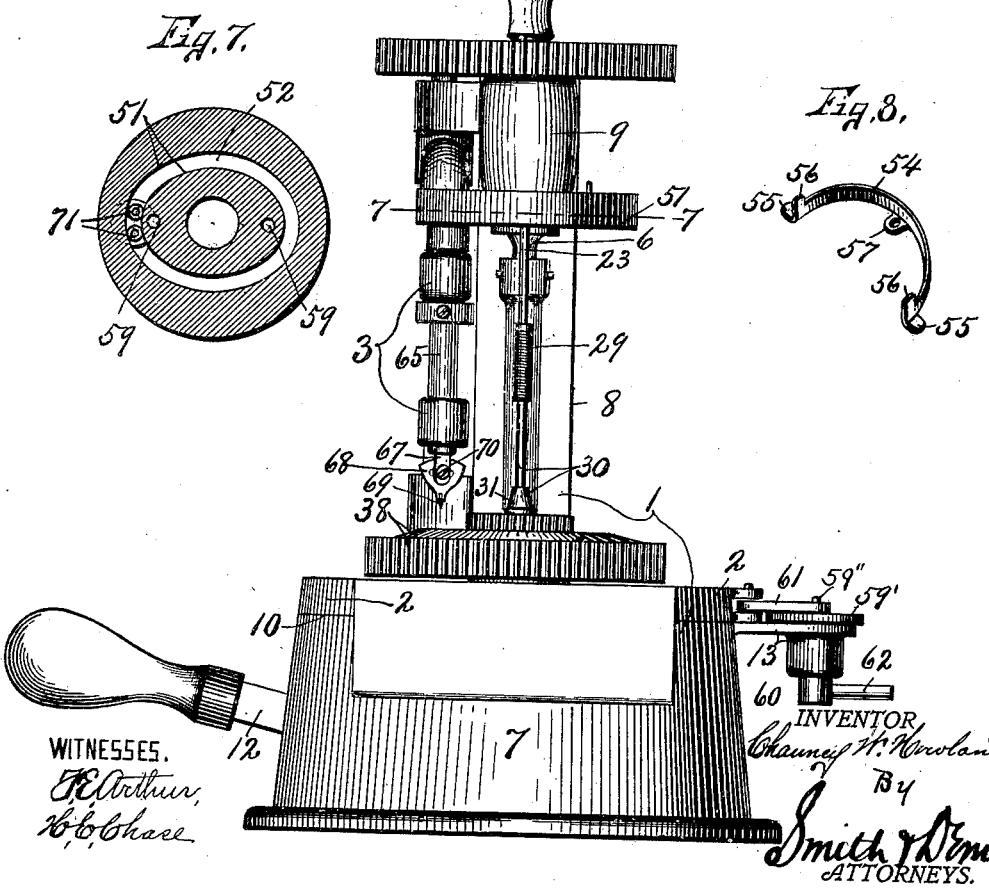

No. 701,046. Patented May 27, 1902.
C. W. HOWLAND.
MACHINE FOR MARKING OR CUTTING LENSES.
(Application filed Oct. 11, 1901.)
(No Model.) 3 Sheets—Sheet 2.
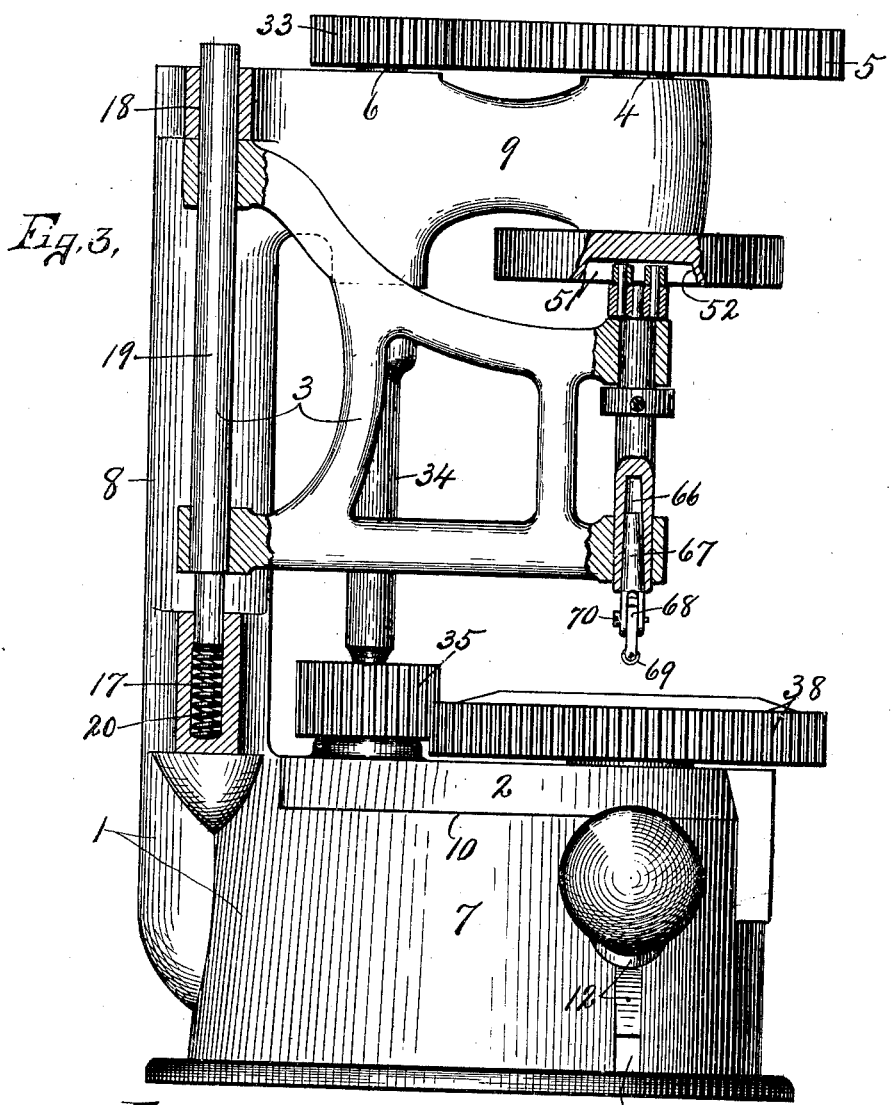
Fig. 3.
Fig. 4.
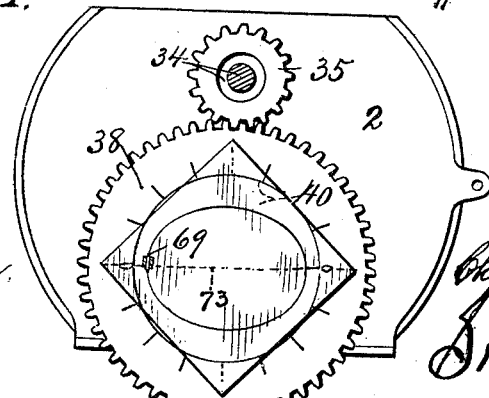
WITNESSES:
INVENTOR
Chauncy W. Howland
By
Smith & Denison
ATTORNEYS.

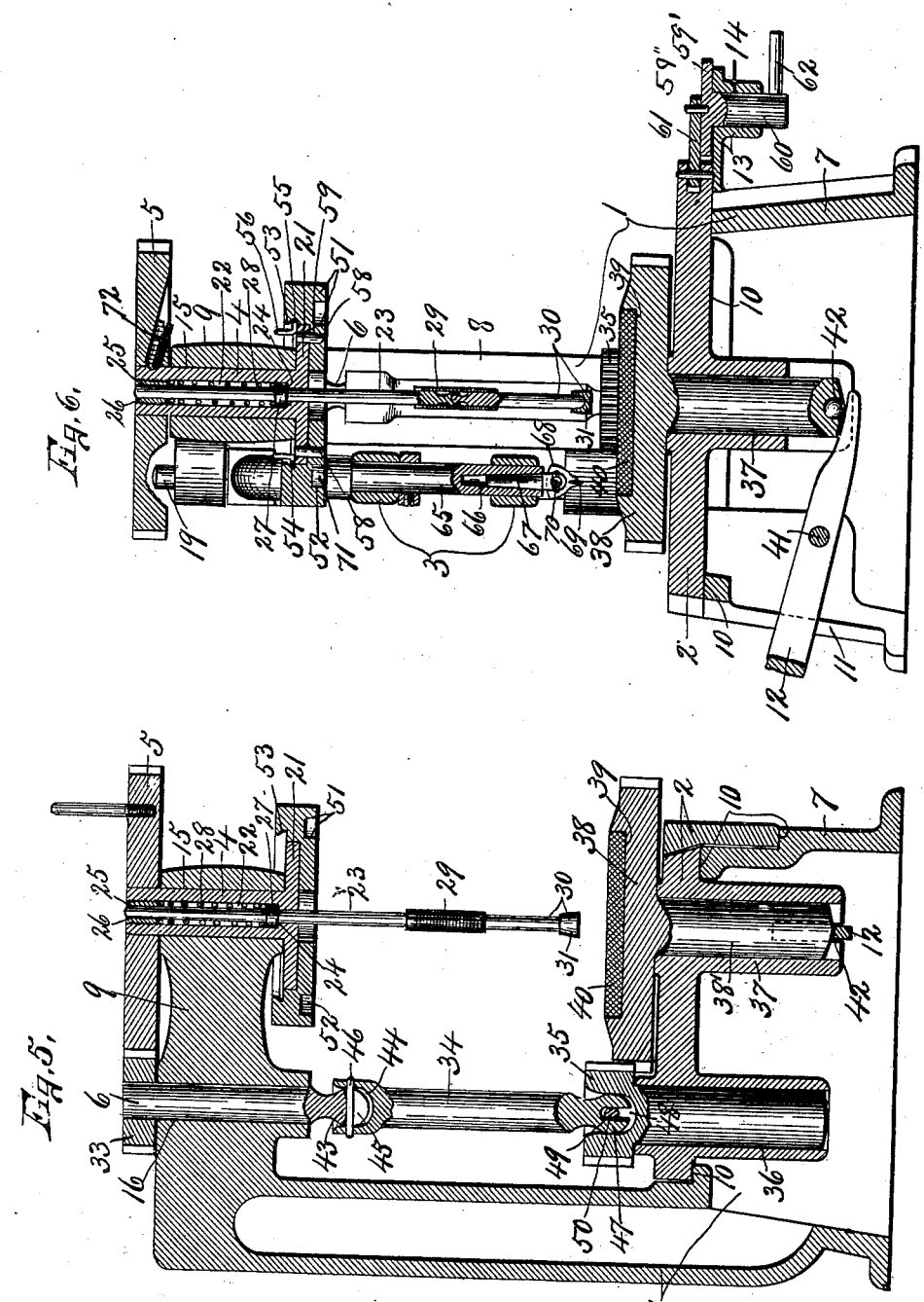

UNITED STATES PATENT OFFICE.

CHAUNCEY W. HOWLAND, OF GENEVA, NEW YORK, ASSIGNOR TO THE STANDARD OPTICAL COMPANY, A CORPORATION OF NEW YORK.

MACHINE FOR MARKING OR CUTTING LENSES.

SPECIFICATION forming part of Letters Patent No. 701,046, dated May 27, 1902.

Application filed October 11, 1901. Serial No. 78,350. (No model.)

*To all whom it may concern:*

Be it known that I, CHAUNCEY W. HOWLAND, of Geneva, in the county of Ontario, in the State of New York, have invented new and useful Improvements in Machines for Marking or Cutting Lenses, of which the following, taken in connection with the accompanying drawings, is a full, clear, and exact description.

This invention relates to improvements in machines for cutting or marking lenses or similar regular or irregular forms or patterns.

The object of my invention is to provide means whereby different sizes of the same form of lenses or similar articles may be cut or marked without changing the position, size, or shape of the lens-form.

Another object is to provide a driving mechanism for the rotary lens-support comprising universal joint, whereby the support may be moved laterally relatively to the cutter without liability of changing the angle or direction of the optical axis of the lens relative to the mechanical axes of the lens-form.

A further object is to provide a rotary cutter connected to the frame in such manner that the cutting edge of the cutter is always in a plane substantially parallel with the forming line or surface of the lens-form.

Another object is to provide means whereby the cutter or marker may be adjusted at different angles relative to the supporting bed or surface of the lens.

A still further object is to mount the lens-form in such manner that it may be readily removed or placed in position when desired without removing or displacing any of the other parts of the machine and whereby the mechanical axes of the lens-form are caused to assume a definite or known position relative to suitable graduations or indicators upon the lens-support; and another object is to provide means for shifting the position of the lens-support relative to the cutter and lens-form for cutting the different sizes of lenses, said means having graduations whereby the support may be set to cut any predetermined size of lens.

To this end the invention consists in the combination, construction, and arrangement of the component parts of a lens cutting or marking machine, as hereinafter fully described, and pointed out in the claims.

Referring to the drawings, Figures 1 and 2 are respectively top plan and front elevation of a machine embodying my invention. Fig. 3 is a side elevation, partly in section, of the device seen in Figs. 1 and 2. Fig. 4 is a top plan of the detached sliding bed, the lens-support, and its driving mechanism mounted thereon, showing particularly the operation of the cutting of a lens from a blank. Figs. 5 and 6 are sectional views taken, respectively, on lines 5 5 and 6 6 of Fig. 1. Fig. 7 is a sectional view taken on line 7 7 of Fig. 2, showing particularly the lens-form and the means for controlling the movement of the cutter. Fig. 8 is a perspective view of the detached catch for holding the lens-form in position.

Similar reference characters indicate corresponding parts in all the views.

In the drawings I have shown a frame 1, upon which is mounted a sliding bed 2, means for reciprocating the sliding bed 2, an oscillating arm or bracket 3, a rotary sleeve or spindle 4, having a driving member 5, and a rotary shaft 6, actuated by the driving member 5. The frame 1 may be of any desired form, size, or construction, being shown as consisting of a base 7, an upright standard 8 projecting upwardly from the base and having its upper end provided with a laterally-extending arm 9. The upper face of the base 7 is substantially horizontal and is provided with suitable ways 10 for receiving and supporting the sliding bed 2, said base being also provided with an opening 11 in one of its side walls for receiving a lever 12, presently described.

Projecting from one side of the base 7 and preferably formed integral therewith is an arm or bracket 13, having a vertical opening 14 for receiving and supporting the means, presently described, for reciprocating the sliding bed 2.

The base 7 is preferably formed hollow for reducing the cost of material and also for receiving suitable bearings on the sliding bed previously mentioned.

The laterally-extending arm 9 is provided with substantially parallel vertical openings 15 and 16, the opening 15 forming a bearing for the sleeve 4, and the opening 16 is adapted to receive the shaft 6. The frame 1 is also provided with vertical bearings 17 18, the bearing 17 projecting upwardly from the upper face of the base 7, and the bearing 18 extends laterally from the arm 9, these bearings 17 and 18 being arranged to receive and support the swinging arm or bracket 3. The arm or bracket 3 is provided with an upright shaft or spindle 19, having its lower and upper ends journaled, respectively, in the bearings 17 and 18, the lower bearing 17 being provided with a spring 20, interposed between the lower end of the shaft 19 and the bottom wall of the socket 17 for yieldingly supporting the arm or bracket 3 and holding the same in its extreme upper position for the purpose hereinafter described, it being understood that the bracket 3 and its supporting-shaft 19 are so arranged as to permit the bracket to be moved downwardly against the action of the spring 20.

The sleeve 4 is revolubly mounted in the opening 15 and preferably extends above and beneath the opposite ends of the said opening, the lower end of the sleeve being provided with an annular flange 21, preferably formed integral with said sleeve, and its upper end is adapted to receive and support the gear or driving member 5, said flange 21 and the driving member 5 being engaged with the upper and lower faces of the arm 9 for preventing endwise movement of the sleeve 4 in its bearing. This sleeve 4 is also provided with a lengthwise socket 22, preferably open at both ends for receiving a substantially vertical stem or spindle 23, the lower end of said socket 22 being reduced in diameter for forming a shoulder 24, and the upper end is provided with a removable plug or bushing 25, preferably screw-threaded and having a central opening 26 for receiving the upper end of the stem or spindle 23. This stem or spindle 23 is provided with an annular shoulder or collar 27, normally held in engagement with the shoulder 24 by a suitable spring 28, interposed between the upper face of the collar 27 and the lower face of the bushing 25.

The stem or spindle 23 is arranged to revolve in the socket 22 and is also adapted to move endwise against the action of the spring 28. Secured to the lower end of the stem or spindle 23 is a flexible connection, as a spring 29, carrying a suitable lens-holder 30, the lower end of said holder being formed with a yielding or rubber tip 31 for engaging the lens.

As previously stated, the operating member 5 consists of a gear secured to the upper end of the sleeve 4, being provided with a suitable handpiece 32, by which said gear is rotated.

The shaft 6 is provided with a pinion 33 at its upper end, meshing with the gear 5, and the lower end of said shaft is connected by a shaft-section 34 to a suitable pinion 35, revolubly mounted in a bearing 36 in the sliding bed 2. This sliding bed is also provided with an additional bearing 37, in which is journaled a rotary lens-support 38, having peripheral gear-teeth meshing with the pinion 35 and also provided with a recess 39 in its upper face for receiving a pad 40, upon which the lens is adapted to rest. This rotary lens-support 38 is also movable vertically within the bearing 37, being provided with a hub or shank 38', inserted in the bearing 37, the means for effecting this vertical movement consisting of the lever 12, which is pivoted at its intermediate portion at 41, one end being provided with a suitable handpiece and its other end being arranged to engage a bearing 42 upon the lower face of the hub or shank 38'. This bearing 42 usually consists of a hardened ball inserted in a socket in the lower end of the shank 38' and is held in position by crimping the adjacent portions of the hub or shank upon the ball, so that only a small portion of the ball projects below the lower end of the hub or shank 38'.

The lower end of the shaft 6 is provided with a spherical bearing 43, arranged in a socket 44 in the upper end of the section 34 and formed with a slot 45 for receiving a pin 46, secured to the walls of the socket 44. The lower end of the section 34 is similar to the lower end of the shaft 6, being provided with a spherical bearing 47, projecting into a socket 48 in the upper face of the pinion 35 and having an open-ended slot 49 for receiving a pin 50, secured to the pinion 35.

Detachably secured to the lower end of the sleeve 4 is a lens-form 51, having a groove 52 in its lower face, and its upper face is formed with an annular engaging shoulder 53. Secured to the upper face of the annular flange 21 is a semicircular spring 54, having laterally-projecting shoulders 55, which are arranged to engage the annular shoulders 53 for holding the lens-form in its operative position, said spring being provided with upward projections 56, adapted to be engaged by the fingers for compressing the spring and releasing the shoulders 55 from engagement with the shoulders 53, whereupon the lens-form may be removed. The gears 5 and 38 and the pinions 33 and 35 being respectively of the same size, it is evident that the rotation of the form 51 is synchronized with the part 38.

Any desired means may be employed for securing the spring 54 to the flange 21 of the sleeve 4, said spring being provided with an apertured lug 57, adapted to receive a suitable screw (not illustrated) engaged with the flange 21. This flange 21 is provided with studs or pins 58, which are adapted to enter sockets 59, arranged diametrically opposite to each other upon the major axis of the lens-form for holding said lens-form from rotary movement when placed in operative position.

The means for reciprocating the sliding bed 2 consists of a rotary plate 59', having a shank 60 journaled in the bearing 14 and having a crank-pin 59″ connected to the sliding bed by a link 61, said shank being provided with a suitable handpiece 62, by which the plate may be rotated.

Mounted upon the arm or bracket 13 is a graduated scale 63, coöperating with the indicating line or marker 64 upon the rotary plate 59′ for indicating the size of the lens to be cut or marked.

Mounted upon the oscillating bracket 3 is a rock-shaft 65, having its lower end provided with a socket 66, in which is secured by a tight fit a shank 67, carrying a cutter-support 68. This support 68 is pivotally mounted upon the lower end of the shank for permitting the adjustment of the cutter 69 to any desired angle relative to the surface of the lens-support 38, said cutter-support being held in position by a suitable clamping-screw 70. The purpose of this adjustment is to permit the cutter to be adjusted at substantially right angles to concave or convex surfaces of the lenses, the cutting edge of the cutter being always in a plane coincident with the axis of the rock-shaft 65.

The connection between the stem or spindle 23 and the lens-holder 30 is similar to the connection between the shaft 6 and section 34—that is, the adjacent ends of the said parts are connected by a ball-and-socket joint and which permits the lateral movement of the lens-holder 30 independently of the stem or spindle 23, the spring 29 serving to return the holder 30 to its normal position in alinement with said stem or spindle. It is thus evident that the holder 30 and stem 23 rotate with the lens and its support and that even though the tip 31 is engaged with the lens at one side of its center its universal connection with the stem 23 permits its eccentric movement and remains in engagement with the lens at the same point during its rotation in the operation of cutting or marking the lens.

I preferably employ a roller-cutter 69, which is journaled in the lower end of the support 68, and, as previously stated, this support 68 is pivotally mounted upon the shank 67, being provided with a transverse slot for receiving the clamping-screw 70, by which means the roller-cutter may be tilted at any desired angle with the surface of the lens, so as to engage the lens at substantially right angles with the surface to be cut or marked, this being a particularly important feature of my invention, for the reason that it enables the operator to readily cut with an ordinary roller-cutter any form of convex or concave lens. In order to maintain the cutting edge of the cutter in a plane substantially parallel with the forming line or surface of the form, I provide the upper end of the rock-shaft 65 with suitable studs or shoulders, in this instance consisting of a pair of rollers 71, arranged in close proximity to each other and guided in the groove 52. Although this employment of a pair of rollers is particularly efficient in keeping the cutting edge of the roller 69 in a plane parallel with the forming line or surface of the form 51, it is evident that other means may be employed for effecting this result—as, for instance, I may employ a grooved wheel operating in conjunction with a flange form, the flange fitting the groove, or I may employ two or more rollers in conjunction with a flange form, or any other equivalent means may be used for oscillating the rock-shaft 65 for the purpose described.

The driving-gear 5 is secured to the upper end of the sleeve 4 by a suitable set-screw 72, which permits the form 51 to be set at any desired position, with its major axis in substantially the same vertical plane as the corresponding marks upon the lens-support 38. The upper surface of the lens-support around the periphery of the pad 40 is preferably graduated, and the pad 40 is rotatable in the recess 39 for permitting its axial line 73, representing the optical axis of the lens, to be adjusted to any predetermined graduation.

In the operation of my invention the sliding bed is moved to the desired position for cutting the lens of a predetermined size, (indicated by the scale 63.) The handpiece 12 is then rocked to elevate the lens-support and to force the lens-blank into engagement with the tip 31 and cutter 69, said lens being held in this position and the lens-form and lens-support are then rotated by means of the driving-gear 5 one or more revolutions for the purpose of cutting or marking the blank in the form of a lens corresponding to the contour of the form 51. During this rotation of the form and lens-support the bracket carrying the cutter is oscillated toward and away from the vertical axis of the rotary form and lens-support by reason of the engagement of the studs or rollers 71 with the forming-surface of the lens-form.

It might be here stated that although a form has been used to move a cutter-supporting arm away from the vertical axis of the form in which a spring or other device has been used to return the cutter-support, or rather to hold the same against the periphery of the form, I believe myself to be the first to provide a lens-form whereby the cutter is moved back and forth toward and away from the vertical axis of the form, according to which axis, either the major or minor axis, is presented to the rollers or studs 71. During this rotation of the lens-form the shaft 65 is rocked by means of the rollers 71 in order to keep the cutting edge in a plane parallel with the forming-surface of the lens-form. When the lens-blank has been sufficiently cut or marked, the lever 12 is released, whereupon the lens-support 38 automatically returns to its normal position. The margin of the lens-blank outside of the mark or cut may be then readily broken upon the line in the usual manner. When desired to remove the lens-form for the purpose of replacing it by a different form or for any other purpose, the free ends of the spring are compressed, thereby withdrawing the shoulders 55 out of engagement with the shoulder 53, whereupon the lens-form may be withdrawn downwardly from the flange 21 and removed beneath the lower face of the tip 31 of the lens-holder 30, it being understood that the disk having the lens-form is provided with a substantially central opening which normally receives the stem 23 and is sufficiently large to permit the lens-form to be readily removed, as described.

The operation of my invention will now be readily understood upon reference to the foregoing description and the accompanying drawings, and it will be noted that some change may be made in the mechanisms for carrying out the various objects of my invention without departing from the spirit thereof. Therefore I do not limit myself to the precise construction, combination, and arrangement shown and described.

Having described my invention, what I claim, and desire to secure by Letters Patent, is—

1. In combination with a rotary support for the article to be cut or marked and having an independent lateral sliding movement, a rotary form synchronized with the rotation of the support and having parallel bearing-surfaces, a cutter or marker engaged with the article and means engaged with said surfaces to move the cutter toward and away from the axis of the form.

2. In combination, a laterally-slidable supporting member for the article to be cut or marked, a cutting or marking member, one of the members being movable relatively to the other to cut or mark the article, a form having parallel surfaces operating to control the position of the cutter on the article, and means to keep the cutting edge of the cutter in a plane tangential to the forming-line of the form.

3. A laterally-slidable support and a cutter or marker for the article to be cut or marked, one of the parts being movable relatively to the other for cutting or marking the article, a form having parallel surfaces operating to control the position of the cutter or marker, said cutter or marker having an independent rocking movement to change the direction of its axis, and means coacting with said surfaces to effect said rocking movement of the cutter or marker for the purpose set forth.

4. In combination with a form and a rotary support for the article to be cut or marked, a cutter or marker, means coöperating with the form to move the cutter relative to the axis of rotation of the support, and means to vary the angle of the axis of the cutter relatively to the surface of the article to be cut or marked for the purpose set forth.

5. A form and a laterally-sliding support for the article to be cut or marked, the form having parallel bearing-surfaces, connections having a universal joint therein to simultaneously rotate said parts, a cutter or marker and additional means coacting with said surfaces to change the position of the axis of one part relatively to the other.

6. A revoluble form and a revoluble support for the article to be cut or marked, means to revolve the parts simultaneously, a cutter or marker, and additional means to move the support relatively to the axis of revolution of the form.

7. In a lens cutting or marking machine, a revoluble support for the lens, a cutter or marker, and means having parallel surfaces and contact-points coacting therewith to move the support relative to the cutter or marker for the purpose described.

8. A sliding bed, a rotary lens-support and a universal shaft connected to rotate the support, in combination with a cutter or marker for the lens.

9. In combination, a sliding bed, a cutter or marker, a revoluble support for the article to be cut or marked mounted on the bed, in combination with a universal shaft connected to rotate the support and having one end movable with the sliding bed, and means to rotate the shaft.

10. In a lens cutting or marking machine, a lens-form and a laterally-slidable rotary lens-support having a graduated center piece to indicate the direction of the major axis of the lens-form, and a cutter or marker for the lens controlled by the form.

11. In combination with a rotary lens-support, a rotary member connected to rotate with the support, a lens-form detachably mounted on said member, means movable independently of said form and member for holding the form in operative position and a cutter actuated by the form for the purpose described.

12. In a lens cutting or marking device, a rock-shaft, a cutter-support secured to the rock-shaft and having an independent rocking movement relatively thereto, clamping means for holding the cutter-support in its adjusted position and a rotary lens-form coöperating with means to hold the cutter in a plane tangential to the forming-surface of the form.

13. In combination with a rotary form having parallel forming-surfaces, an oscillating bracket, a rock-shaft mounted on the bracket, a cutter or marker secured to the rock-shaft, and means mounted on the rock-shaft and engaged with the surfaces at this point for oscillating the bracket and rocking the shaft in the bracket.

14. In combination, a rotary lens-support, a rotary form, a laterally-yielding lens-holder, means to actuate the support and form, a cutter or marker, and means actuated by the form for controlling the position of the cutter.

15. In combination with a rotary lens-support, a holder for the lens yieldingly mounted to move laterally and endwise for the purpose described.

16. A sliding bed carrying a rotary lens-support, a lens form and cutter, and driving means for the form flexibly connected to the bed to rotate the support.

17. A sliding bed carrying a rotary lens-support, a lens form and cutter, driving means for the form flexibly connected to the bed to rotate the support, a crank-plate connected to slide the bed, and graduated means coacting with the plate to indicate the position of the bed relative to the cutter.

18. A rotary form and cutter, a rotary lens-support having graduations thereon and provided with an independently rotary center piece marked to locate the position of the optical axis of the lens relative to the graduations, and means to shift the support independently of the form and cutter.

19. In combination, a rotary form, a cutter, a rotary lens-support movable laterally, and provided with an independently-movable member marked to locate the position of the optical axis of the lens.

20. In combination with a cutter, a rotary lens-form and a rotary lens-support, one of the parts being movable laterally to shift its axis of revolution relative to the other, for the purpose set forth.

21. In combination, a cutter, a rotary lens-form, a revoluble lens-support having a lateral movement, means to move the support laterally, and additional means to indicate the size of the lens to be cut.

22. A rotary lens-form, a rotary lens-support, means to move the lens-support laterally, driving means for rotating the form and support, a cutter, and a laterally-yielding lens-holder for the purpose described.

In witness whereof I have hereunto set my hand this 5th day of October, 1901.

CHAUNCEY W. HOWLAND.

Witnesses:
LEWIS W. KEYES,
A. L. OASTLER.